March 1, 1960  C. PEARSON, JR  2,926,916
TOY
Filed Jan. 9, 1958  2 Sheets-Sheet 1
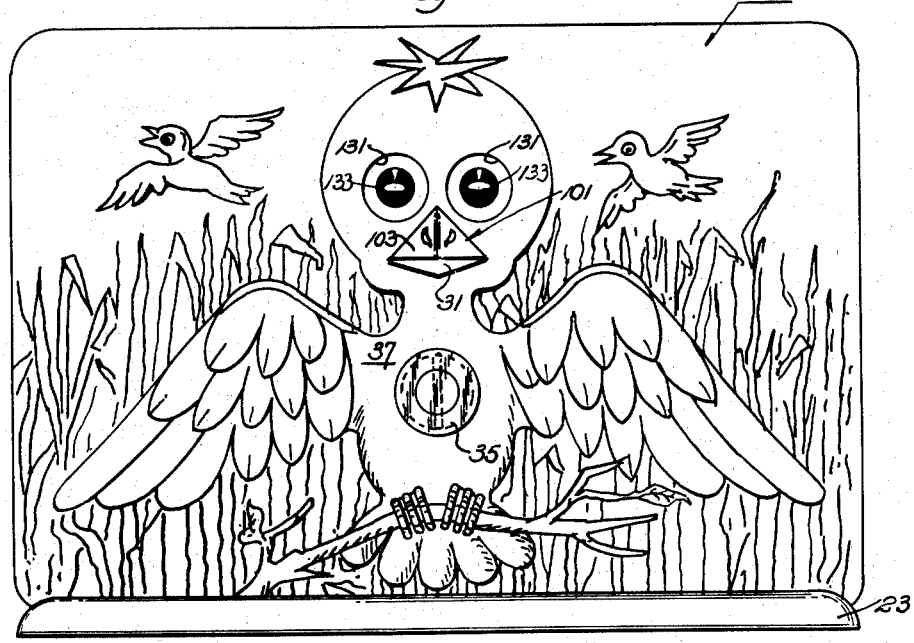
INVENTOR.
Charles Pearson Jr.
BY
Soans, Anderson, Luedeka & Fitch
Attorney.

March 1, 1960 C. PEARSON, JR 2,926,916
TOY
Filed Jan. 9, 1958 2 Sheets-Sheet 2

INVENTOR.
Charles Pearson Jr.
BY
Soans, Anderson, Luedeka & Fitch
Attorney.

United States Patent Office 2,926,916
Patented Mar. 1, 1960

2,926,916
TOY

Charles Pearson, Jr., Elmhurst, Ill., assignor to Marvin I. Glass, Chicago, Ill.

Application January 9, 1958, Serial No. 707,893

6 Claims. (Cl. 273—102.2)

The present invention relates generally to a toy which includes a target designed to be struck by a suitable missile or projectile and more particularly to a toy having a target connected to other elements of the toy which indicate by visual and audible means when the target is struck.

In order to appeal to the imagination, a target toy is preferably fabricated in a form which is representative of an animal, bird, or the like and which produces audible and visual effects simulating life-like activity which cease in response to the impact of a suitable projectile upon the target so as to give the effect of killing or stunning the simulated animal. A toy of this type is desirably of simple and inexpensive construction, however, because of the impact and hard wear which it must withstand, a target toy of this type is preferably of sturdy and durable construction to provide for a long and useful life.

Accordingly, it is the primary object of the present invention to provide a new and improved target toy which produces audible and/or visible effects when struck. It is another object of the present invention to provide a toy of the type described which produces audible and/or visible activities which are adapted to cease in response to the striking of the target. It is a further object of the present invention to provide a toy of the type described which is of simple and desirable construction. Further objects of the present invention will become known in the following description and the accompanying drawings of a preferred embodiment in which:

Figure 1 is a front elevational view of a target toy in the form of a bird which includes various of the features of this invention;

Figure 2 is a plan view of the toy illustrated in Figure 1;

Figure 3 is a side elevational view of the toy illustrated in Figure 1;

Figure 4 is a plan view of a member which cooperates to produce an eye effect when the target is hit by a projectile;

Figure 6:
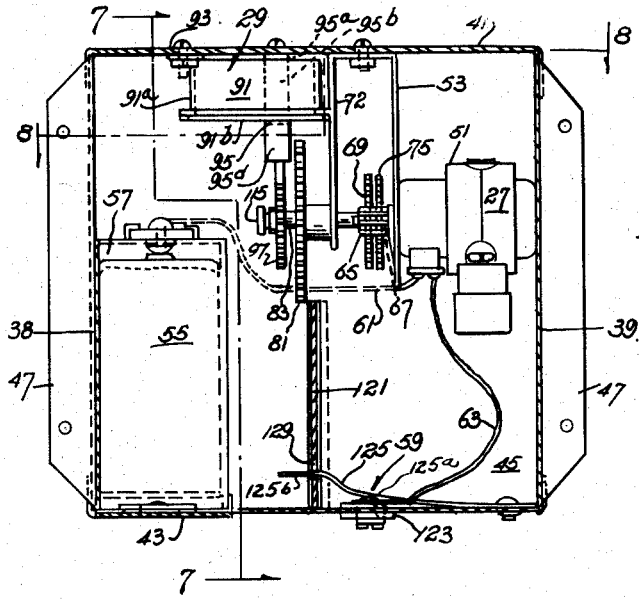
Figure 6 is an enlarged front elevational view, partially in section, of the mechanism which activates the target toy shown in the preceding drawings.

The illustrated target toy includes a decorative mounting plate 21 which is set in a suitable base 23, and on which a more or less fanciful representation of some suitable object to be hit by a missile is depicted. The representation may be of an animal, soldier, Indian, or any other suitable objects as desired. As is shown in the drawings, the object presented is a fanciful representation of a crow or other bird. In operation, the selected target toy is adapted to produce a sporadic noise which, in this case, simulates the cawing of a crow but can be readily revised to simulate any other sound. The target toy also provides a simultaneous opening and closing movement of the crow's beak which is intended to give the life-like effect of a mocking crow.

When the designated portion of the target area is hit, the toy is adapted to indicate this impact by cessation of the cawing sound and discontinuance of the beak movement. In addition, the eyes of the crow are adapted to fall from their sockets and to be replaced by a pair of crosses which humorously indicate that the bird has been stunned or killed. Of course, if it is desired to employ a different animal in the representation, a different sound may be produced and the simulated animal may employ other moving parts.

The audible and visible effects which give illusory life to the crow-like target and which indicate the target has been hit are operated by a working mechanism which is substantially enclosed within a housing 25. The housing 25 is attached to the rearward side of the decorative platet 21 and includes a suitable motor means 27 which drives a noise producing means 29 adapted to produce the desired sound. The motor means 27 also actuates a moving element 31 which is adapted to simulate activity of the crow target, and which, in this case, forms a portion of the bill of the crow. An additional visual effect is provided by movement of a plate 33 which is adapted to provide the above described eye movement when the target is properly struck. Extending forwardly of the housing 25 and through the decorative mounting plate 21 is a target 35 which is movable upon impact to discontinue the activity of the sound producing means 29 and the beak element 31. In addition, movement of the target disk 35 also actuates movement of the plate 33 to effect the desired simulated movement of the crow's eyeballs in their sockets.

As has been pointed out, the decorative mounting plate 21 includes a fanciful representation of a crow 37 and is preferably large enough to serve as a back stop for projectiles which may miss the target disk 35. As illustrated, the target 35 is of a circular shape and is positioned generally in the mid-section of the simulated crow 37.

The housing 25 which is attached to the rearward side of the plate 21, is generally of rectangular form having a pair of side walls 38 and 39, a top 41, a bottom wall 43, and a rearward wall 45. Each of the side walls 37 and 39 is provided with a flange 47 which is adapted to be attached to the back of the decorative plate 21 by suitable fasteners, as indicated at 49 in Figure 2.

While various suitable power means may be employed in a toy of this type, in this instance, a small electric motor 51 is provided for driving the sound producing means and for causing movement of the beak element 31. The motor 51 is suitably secured between the side wall 39 of the housing 25 and a bracket 53 attached to the top 41 of the housing 25. Energy may be suitably supplied to the motor 51 from an exterior source or from a battery located within the housing. In this case, the source of electrical energy is provided by a battery 55 which is located within a suitable compartment 57 and which is connected, as illustrated and as will be described, to the motor through a lead wire 61, and through the housing 25, a switch 59 and a lead wire 63.

Since the illustrated motor 51 operates at high speed, a suitable speed reduction means is provided to produce the proper power output and speed from the motor 51. The illustrated speed reduction means includes a pinion gear 65 on the motor drive shaft 67 which meshes with a gear 69 supported upon a cross shaft 71. The cross shaft 71 is journalled for rotation in the bracket 53 and a parallel bracket 72 which is also attached to the top 41 of the housing 25. Also supported on the shaft 71 is a pinion gear 73 which is adapted to rotate with the gear 69. The pinion gear 73 engages a large gear 75 which is attached to a shaft 77 journalled in the brackets 53 and 72. One end of the shaft 77 extends through the bracket 72 and carries at its other end a small pinion gear 79 which engages a larger gear 81 which is attached to a shaft 83 journalled in the bracket 72. The linkages which operate the sound producing means 29 and the bill element 31 are mounted to the shaft 83 as will be described.

The sound producing means 29 which is adapted to produce the cawing sound for the crow, includes a drum shaped sound box 91 which is attached to the top wall 41 of the housing and depends therefrom. The sound box 91 is fabricated of thin material such as relatively stiff plastic or the like, and includes a cylindrical side wall 91a and a drum face 91b. The entire box is preferably fabricated by molding and is provided with tabs 93 by which the drum may be attached to the top wall 41 by a suitable fastener. Sound is produced on the drum by means of a vibratable member 95 which bears against the face of the drum so as to cause it to vibrate.

Figure 7:
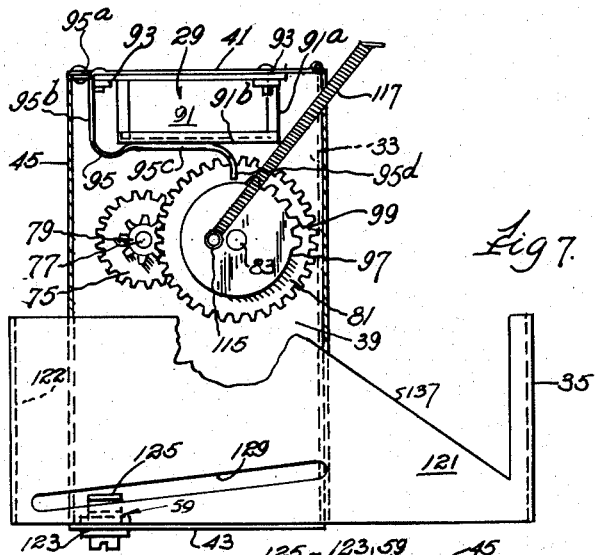
Figure 7 is a sectional view taken along line 7—7 of Figure 6 with a portion broken away so as to more clearly illustrate the actuating mechanism.
Figure 8:
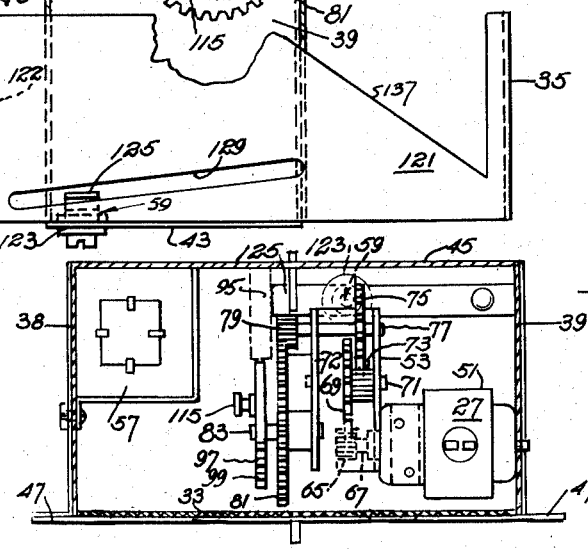
Figure 8 is a sectional view taken along line 8—8 of Figure 6.

The vibratable member 95 illustrated, comprises a curved strip of metal having an end section 95a which is connected to the top wall 41 as illustrated in Figures 6 and 7, a depending portion 95b which extends downwardly along the wall 91a of the drum, a transverse contacting portion 95c which lies adjacent the face 91b of the drum, and a depending section 95d which is vibrated periodically, as will hereinafter be described, to produce the sound.

The means for vibrating the depending section of the vibration-producing member 95 in the illustrated structure comprises an interrupted gear 97 which is attached to the shaft 83, for rotative movement therewith. The interrupted gear 97 includes a raised tooth section 99 which extends over a limited portion of the periphery of the gear. In operation, as the gear 97 is rotated in a clockwise direction in Figure 7, the sounding box 91 will not vibrate until the depending section 95d of the vibratable member 95 is contacted by the raised tooth section 99 of the gear 97 to cause the contacting portion 95c to strike against the drum face 91b thereby producing a simulated crow-like cawing sound. The duration of the cawing sound and the period of silence may be readily adjusted to desired lengths by varying the raised tooth section 99 or the speed of rotation of the gear 97. This type of mechanism, of course, can be designed to produce other audible effects depending upon the simulated target employed.

Figure 5:
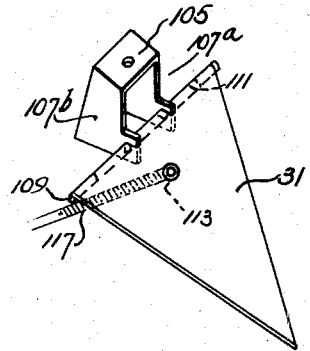
Figure 5 is an enlarged perspective view of the lower bill portion and the supporting bracket of the bird target shown in Figure 1.

The embodiment of the invention illustrated, as has been pointed out, is formed to simulate a crow and includes a beak section 101 which is adapted to simulate the illusion of life and movement. The beak section 101 of the crow includes the lower movable beak element 31 and a generally V-shaped upper beak portion 103 which extends outwardly of the face of the simulated crow 37 and which is fixedly secured to the mounting plate 21. The movable element 31, shown particularly in Figures 1 and 3, is complementary to the upper beak portion and is generally triangular in shape. It may be hingedly attached either to the housing 25 or to the mounting plate 21, to provide a simulated opening and closing beak action. However, in this embodiment, the element 31 is hingedly secured to the housing 25 through a bracket 105, shown in Figures 2 and 5, connected to the housing top wall 41. The bracket 105 illustrated includes a pair of depending arms 107a and 107b which carry, at their lower extremity, a hinge pin 109 which fits in a pair of beaded sections 111 along the inner edge of the lower beak element 31.

Movement of the bill element 31 is effected by a suitable link which is connected at one end to the bill element 31 at the point 113 and which extends to a pin 115 which is positioned on one of the side faces of the cam 97. By positioning the pin 115 in proper eccentric relation to the axis of the shaft 83 and to the raised tooth section 99, the movement of the beak element 31 is preferably coordinated with the interrupted crow-like cawing sound. In this preferred form, the linkage takes the form of a spring 117 which is relatively stiff and has sufficient compressive strength to effect opening and closing of the movable beak element, relative to the fixed bill portion 103. It has been found that the use of a spring as the link connecting the motor 51 and the movable beak member 31 is desirable in that it prevents damage to the mechanical mechanism which might otherwise result from accidental striking of the lower beak element 31 by a projectile.

Discontinuance of the cawing noise and movement of the lower beak element 31, incident to the simulated stunning or killing of the target crow, is effectuated by the impact of a projectile on the target disk 35. The target disk 35 is suitably mounted to the forward end of a slidable member 121 which extends through the housing 25 and forwardly of the decorative plate 21. The slidable member 121 is movable between a normal forwardly extending position and a retracted position to effectuate operation of the switch 59 which controls operation of the motor 51. The rearward edge of the slidable member 121 is provided with a right angle flange 122 which limits the travel of the slide member when pulled forwardly in the normal extending position.

Various different switches and different types of arrangements for operating the switch may be employed. In this case, the switch 59 is simply and economically constructed of a stationary terminal or contact 123 and a cooperating switch blade 125 of resilient material. The contact 123 is suitably secured to the housing and insulated therefrom by a suitable insulated grommet and is connected to the motor through the lead 63. One end of the switch blade is also secured to the housing at a suitable distance from the contact 123 and is connected through the housing to one of the terminals of the battery 55. The other end of the switch blade 125 is formed in an upward and outward direction to engage within a slot 129 which extends in a rearwardly and downwardly inclined direction within the rearwar portion of the slidable member 121. The center portion 125a of the switch blade is adapted to bear against the contact 123 to energize the motor 51 when the slidable member 121 is in the forwardly extending position and the end 125b of the blade is therefore located within the lower end of the slot 129. However, if the slidable member 121 is forced to move inwardly, as for instance by the impact of the projectile, the end 125b and the blade 125 will ride up the slot 129 to thereby break the contact between the switch blade 125 and the contact 123. This breaking of the contact, of course, de-energizes the motor 51 and causes the cawing noise and the movement of the lower beak element 31 to stop. If the target disk 35 is later pulled outwardly, the circuit to the motor 51 will again be closed by the travel of the switch blade 125 down the incline slot 129 of the slidable member 121 until the switch blade 125 again bears against the contact 123.

The inward and outward travel of the slidable member 121 also causes the eyes of the crow to change their characteristics. In this connection, when the target disk 35 is fully extended, the eyes of the crow appear to be looking in a forward direction. However, when the target disk 35 is hit by a missile or projectile and the slidable member 121 moves inwardly, the eyes disappear from their sockets and are replaced by a pair of crosses which have the well-known connotation of unconsciousness. In order to accomplish this effect, the decorative plate 21 is provided with a pair of holes 131 which corrsepond to the eyeball sockets of the imaginary target crow 37, and a movable eye plate 33 is provided to the rearward of the decorative plate which is slidable from a normally raised position to a lowered position. The eye plate 33 is decorated with a pair of eyeballs 133 which are in registry with the holes or sockets 131 of the decorative plate 21 when the eye plate 33 is in the normal raised position. The eye plate 33 is further decorated with a pair of crosses 135 which are positioned to be in registry with the sockets 131 when the eye plate 33 is in the lowered position.

The eye plate 33 is of flat and generally elongated rectangular form and is guided for movement adjacent the rear surface of the decorative plate 21 by the ends of the top and bottom housing walls 41 and 43 adjacent to the decorative plate 21. The eye plate 33 is also provided with a generally trapezoidal opening 136 through which a portion of the bracket 105 extends to support the lower bill member 31 and through which the spring 117 also passes to connect with the lower beak member 31.

Operation of the eye plate 33 responsive to the travel of the slidable member 121 is provided by the cooperation of an upwardly and rearwardly inclined edge surface 137 of the member 121, as shown in Figure 7, upon which the eye plate 33 is supported through engagement of a slot 139 of suitable width which extends vertically upward from the lower edge of the eye plate 33 and which straddles the inclined edge 137 of the slidable member 121. As can now be readily understood, inward movement of the slidable member 121 incident to striking of the target disk 35 will cam the eye plate 33 downwardly to expose the crosses 135 within the eye sockets 131 of the crow 37, while outward movement of the member 121 will result in the re-exposure of the eyeballs 133 in the normal condition.

Operation of the toy is simple. In the normal target position in which the target disk 35 is outwardly extended, the crow-like target will produce an interrupted cawing noise, which effect is heightened by simultaneous movement of the lower beak or jaw 31 of the target crow. In addition, the eyeballs 133 of the crow are in view.

The impact against the target disk 35 of a missile, such as a dart, pellet, or ball, is indicated by a readily apparent loss of vitality of the target crow which appears to be stunned or killed. The impact of a missile will cause the target disk 35 and slidable member 121 to be inwardly directed and to open the switch 59 thereby deenergizing the motor 51. In this fashion, the cawing noise and the movement of the lower beak element 31 will be stopped. Simultaneously, the eyeballs 133 of the crow will disappear from their sockets 131 and a pair of crosses 135 will appear instead, indicating the demise of the crow.

By outwardly extending the target disk 35 the target crow 37 will again be revitalized and the eyeballs 133 will again appear in their sockets. Thusly, the crow target is again ready for use.

A toy of the type above described is adapted to be easily and economically constructed from a variety of commercially available materials and to provide a long and useful life.

Various modifications in the construction and design of the disclosed toy are within the skill of those versed in the art and are contemplated as being within the principles of the present invention which is to be determined from the appended claims.

I claim:

1. In a target toy actuated by the impact of a projectile, a mounting plate simulating the appearance of an animal, a base for supporting said mounting plate, a housing secured to the rearward of said mounting plate, a target extending from within said housing and through said mounting plate and slidable from an outwardly extending position to an inwardly retracted position, a plurality of active means for indicating the impact of a projectile on said target by the discontinuance of activity, said active means being driven by a power means located in said housing and including a means for producing noise located in said housing and a moving element extending forwardly of said mounting plate for simulating vitality of the animal, said noise producing means comprising a gear driven by said power means having teeth on the peripheral surface thereof, a sound box, and a resilient member having one portion adapted to be engaged by said teeth of said gear to cause a second portion of said member to strike against said sound box to thereby produce noise, said moving element being hingedly connected to said housing for oscillatory movement, said movement being effectuated by a linkage connecting said gear with said moving element, said power means being connected through a switch operable in cooperation with the movement of said target inward of said housing in response to the impact of a projectile from said forwardly extending position to said retracted position, whereby said switch is operated and said power means is stopped causing the activity of said indicating means to be thereby discontinued.

2. In a target toy actuated by the impact of a projectile, a mounting plate simulating the appearance of a bird, a base for supporting said mounting plate, a housing secured to the rearward of said mounting plate, a target extending from within said housing and through said mounting plate and slidable from an outwardly extending position to an inwardly retracted position, and a plurality of active means for indicating the impact of a projectile on said target by the discontinuance of activity, said active means being driven by a motor located in said housing and including a means for producing noise located in said housing and a moving element extending forwardly of said mounting plate for simulating vitality of the bird, said noise producing means comprising a rotating gear driven by said motor having teeth on a portion of the peripheral surface thereof, a drum shape sound box having a drum face, and a resilient member having one portion adapted to be engaged by said teeth of said gear to cause a second portion of said member to strike against said face of said sound box to thereby produce noise, said moving element being hingedly connected to said housing for oscillatory movement, said movement being effectuated by a spring connecting a pin located on said gear with said moving element, said motor being connected to a battery within said housing through a switch operable in cooperation with the movement of said target inward of said housing in response to the impact of a projectile from said forwardly extending position to said retracted position, said inward movement of said target operating said switch to stop said motor to thereby cause the discontinuance of the activity of said active means, and a plate slidably movable in a vertical direction adjacent the rearward surface of said mounting plate from a position indicating absence of impact in which a pair of simulated eyeballs located on said plate are in registry with a pair of holes in said mounting plate to a position wherein said eyes are no longer in registry with said holes to thereby indicate impact of a projectile against said target, said plate being mounted on an inclined surface of said target whereby the inward movement of said target in response to the impact of a projectile causes said plate to be cammed downwardly to said impact indicating position.

3. A target toy comprising a target carrying thereon a portion movable from a first position to a second position and a plurality of active means, said active means including a noise producing mechanism and a moving element simulating activity associated with said target, said active means being connected with said movable target portion in a manner such that positioning of said portion in said first position is effective to activate said active means for continuous operation, and such that movement of said target portion from said first position to said second position incident to the impact of a projectile against said target portion is effective to de-activate said active means.

4. A target toy comprising a support carrying thereon a target which is movable from a first position to a second position, a power means, and a plurality of active means driven by said power means and including a noise producing mechanism and a moving element simulating activity associated with said target toy, said target being connected with said power means in a manner such that positioning of said target in said first position is effective to energize said power means to thereby continuously activate said active means and such that movement of said member from said first position to said second position incident to striking of said target by a projectile is effective to de-energize said power means to thereby discontinue the activity of said active means.

5. A target toy comprising a target carrying thereon a portion movable from a first position to a second position and a plurality of active means including a noise producing mechanism and a moving element simulating activity of a type associated with said target, said active means being connected with said target portion in a manner such that positioning of said portion in said first position is effective to activate said active means for continuous operation, and such that movement of said target portion from said first position to said second position incident to the impact of a projectile against said target portion is effective to deactivate said active means, said noise producing mechanism comprising a sound box, a member having a segment positioned for striking of said sound box, and means engaging said member whereby said striking segment is successively positioned under tension in spaced relation to said sound box and then released for striking of said sound box.

6. A target toy comprising an illustrated target, a target member carried on said target and having secured thereon a target disc for receiving the impact of a properly aimed projectile, said member being movable between a forwardly extending position and a rearwardly retracted position relative to said target, an indicator connected with said target member, said indicator being connected with said member and movable through camming engagement thereof by said target member between a first location and a second location, said first indicator location being associated with the forwardly extending position of said target member and signifying the absence of impact by a projectile against said target disc, said second indicator location signifying impact against said target disc by a projectile and being associated with the rearwardly retracted position of said target member, and a plurality of active means supported on said target and operable to produce activity of a type associated with said illustrated target, said active means including a sound producing mechanism and an oscillating element, said active means being connected with said target member in a manner such that positioning of said target member in said forwardly extending position activates said active means for continuing activity and such that movement of said target member, incident to proper striking of said target disc by a projectile, from said forwardly extending position to said rearwardly retracted position operates to discontinue the activity of said active means.

References Cited in the file of this patent

UNITED STATES PATENTS

| | | |
|---|---|---|
| 1,210,512 | Maurer | Jan. 2, 1917 |
| 1,217,714 | Cox | Feb. 27, 1917 |
| 1,824,811 | Gade | Sept. 29, 1931 |